United States Patent [19]

Won

[11] 4,432,775
[45] Feb. 21, 1984

[54] METHOD AND APPARATUS FOR SEPARATING A SUBSTANCE FROM A LIQUID

[76] Inventor: Vann Y. Won, 6697 Gloria Dr., Sacramento, Calif. 95831

[21] Appl. No.: 403,280

[22] Filed: Jul. 30, 1982

[51] Int. Cl.³ .............................................. B01D 19/00
[52] U.S. Cl. .......................................... 55/41; 55/52; 55/55; 55/190; 55/201
[58] Field of Search ................. 55/41, 52, 55, 182, 55/190, 192, 194, 201

[56] References Cited

U.S. PATENT DOCUMENTS

| | | | |
|---|---|---|---|
| 2,060,242 | 11/1936 | Pulley | 55/190 |
| 2,507,797 | 5/1950 | Martin | 55/190 X |
| 2,572,527 | 10/1951 | Sebald | 55/192 |
| 2,788,080 | 4/1957 | Guarin | 55/201 X |
| 2,861,647 | 11/1958 | Musslewhite | 55/201 X |
| 2,944,626 | 7/1960 | Douglas et al. | 55/190 |
| 3,538,682 | 11/1970 | Chattin et al. | 55/55 X |
| 3,659,957 | 5/1972 | Yuen | 416/179 |
| 4,300,919 | 11/1981 | Lewis et al. | 55/190 X |
| 4,341,534 | 7/1982 | Burger | 55/55 |

FOREIGN PATENT DOCUMENTS

| | | | |
|---|---|---|---|
| 2312279 | 12/1976 | France | 55/194 |
| 211468 | 3/1925 | United Kingdom | 55/194 |
| 498799 | 1/1939 | United Kingdom | 55/55 |
| 2061755 | 5/1981 | United Kingdom | 55/55 |

*Primary Examiner*—Robert H. Spitzer
*Attorney, Agent, or Firm*—Donald J. Singer; Jacob N. Erlich

[57] ABSTRACT

An apparatus for separating a substance from a liquid in which the substance is contained having a vacuum chamber, a container within the chamber for receiving the liquid and an atomizer within the container for atomizing the liquid in order to vaporize the substance contained therein. Once vaporized, the substance is withdrawn from the chamber by the vacuum producing means. A small portion of the atomized liquid is continually withdrawn from the chamber as cleansed liquid while the remainder of the atomized liquid is returned to the container for reatomization and future withdrawal. In addition to the above described apparatus, this invention also includes the method of separating a substance from a liquid.

16 Claims, 6 Drawing Figures

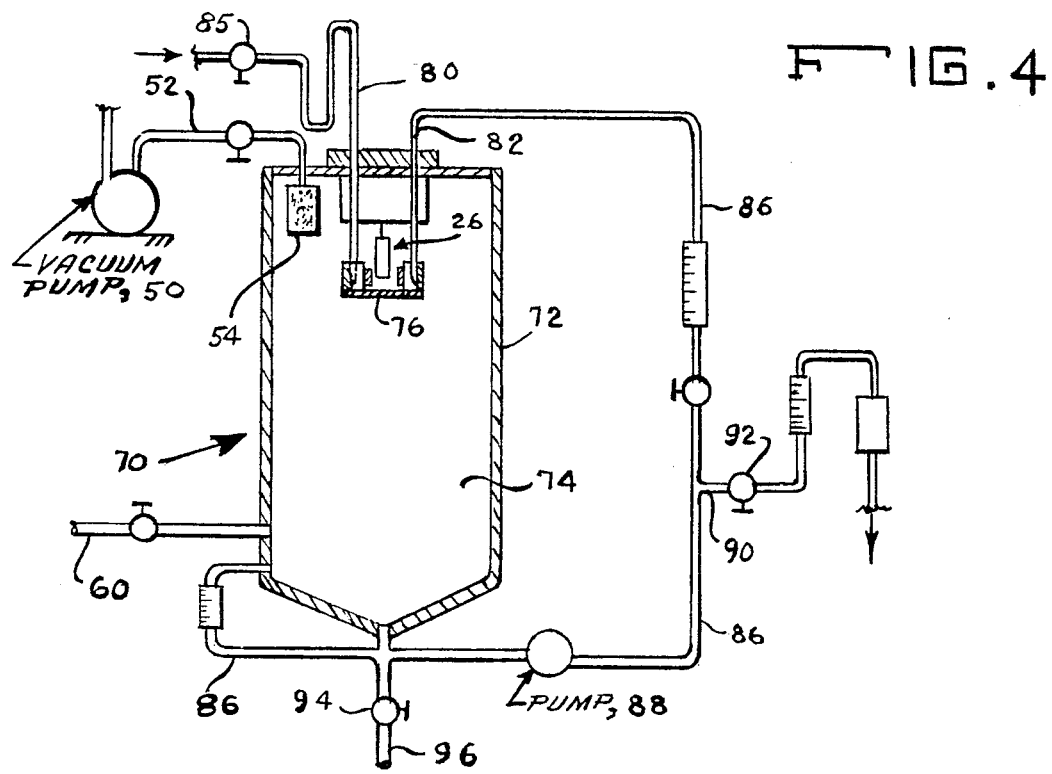
FIG. 4
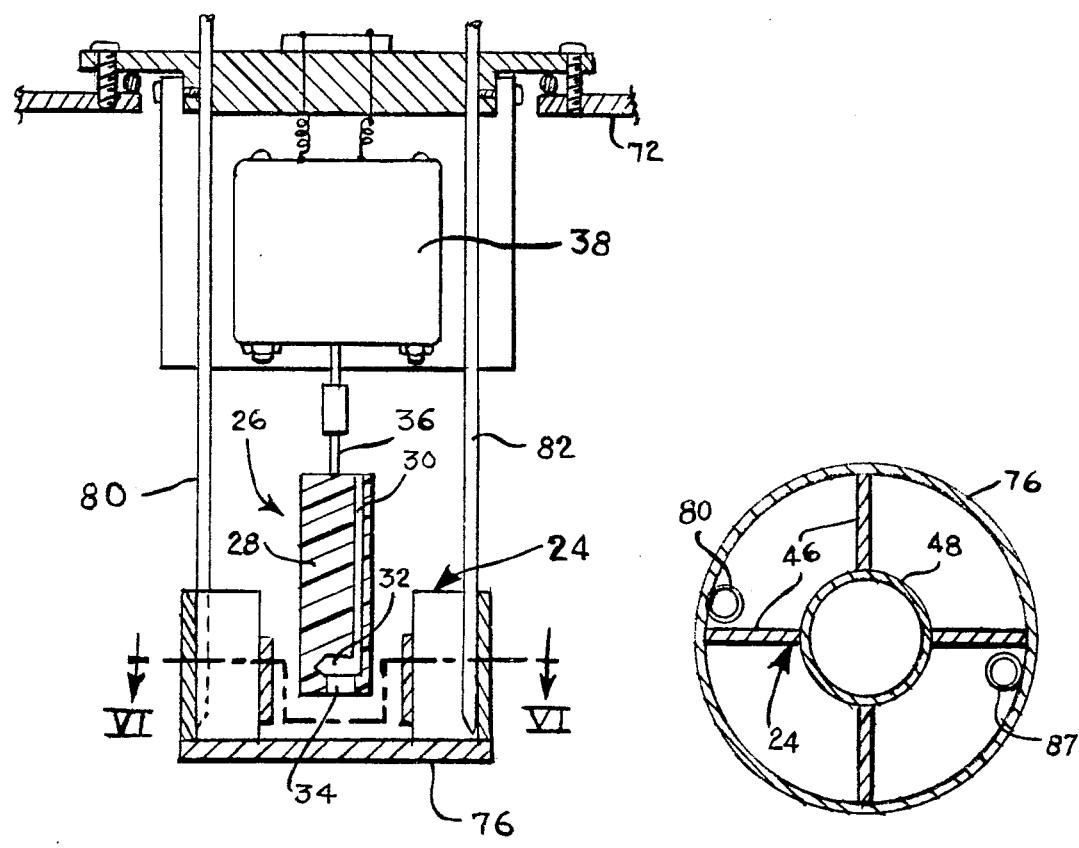
FIG. 5
FIG. 6

METHOD AND APPARATUS FOR SEPARATING A SUBSTANCE FROM A LIQUID

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the separation of a substance from a liquid in which it is contained, and, more particularly, to a method and apparatus which is capable of efficiently and economically separating a volatile substance from a nonvolatile liquid.

There are many instances when it becomes necessary to physically separate a substance from a liquid within which it is mixed or in which it is contained. For example, a nonvolatile liquid such as hydraulic fluid, which is used in the hydraulic test stands of aircraft repair systems, becomes unserviceable when the chlorine contents thereof reaches 50 parts per million. The source of the chlorine within the hydraulic fluid is found in the chlorinated solvents which are used within the aircraft repair system for cleaning and/or degreasing on the test stands. These chlorinated solvents are extremely volatile while the hydraulic fluid as stated above is nonvolatile.

Heretofore, the process of distillation was used for separating liquids. Such a procedure, however, is not applicable to separating all substances and involves a great deal of time and complex systems. Another separation procedure incorporates the introduction of air or nitrogen into the liquid container but such a procedure is highly inefficient.

It therefore would be extremely desirable if a method and apparatus were provided in order to simply, efficiently and economically separate a substance from a liquid in which the substance is contained.

SUMMARY OF THE INVENTION

The present invention overcomes the problems associated with past techniques of material separation by utilizing an atomization technique in which the substance can be atomized to form of a fine mist in a low pressure (vacuum) environment in order to easily withdraw or separate this fine mist or vapor from the liquid in which it had been previously mixed.

In the apparatus provided by this invention, a liquid containing the undesirable substance is continuously fed into a container. This substance may take the form of either another liquid such as a volatile liquid, a gas or even a small solid particulate material. Within this container is situated an atomizer of the type set forth in U.S. Pat. No. 3,659,957 issued to this inventor formerly known as Vann Yuen on May 2, 1972 and which is incorporated herein by reference.

The atomizer causes the atomization of the substance into a fine mist (in the case of a solid particulate, the particulates must be sufficiently small) which thereby creates an infinitely large surface area. When this occurs, the substance to be separated overcomes the surface tension and is released spontaneously into a vacuum chamber surrounding the container and atomizer. The substance is drawn from the chamber while the remaining fluid flows down the walls of the chamber with a portion thereof being removed as cleansed liquid while the remaining liquid is returned to the atomizer container for reatomization.

It is preferable with this invention that the amount of the liquid atomized be approximately ten times the volume of the inlet and outlet flow of liquid. As a consequence thereof, the liquid will be atomized approximately 10 times prior to being discharged. With the addition of heat and appropriate adjustment of flow rates, the present invention will effectively result in the removal of, for example, chlorinated hydrocarbon solvents from approximately 50,000 parts per million to less than 50 parts per million in an extremely short period of time.

It is therefore an object of this invention to provide an apparatus for efficiently separating a substance from a liquid in which it is contained.

It is another object of this invention to provide a method for efficiently and economically separating a substance from a liquid.

It is a further object of this invention to provide an apparatus for separating a substance from a liquid which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 4 is a partially schematic, side elevational view, shown partly in cross section, of an alternate embodiment of the apparatus of this invention for separating a substance from a liquid;

FIG. 5 is an exaggerated, cross sectional view of the liquid container and atomizer utilized within the apparatus of this invention for separating a substance from a liquid; and FIG. 6 is a cross sectional view taken along line VI—VI of FIG. 5 of the alternate embodiment of this invention for separating a substance from a liquid.

DETAILED DESCRIPTION OF THE PREFERRED EMBODIMENT

Figure 1:
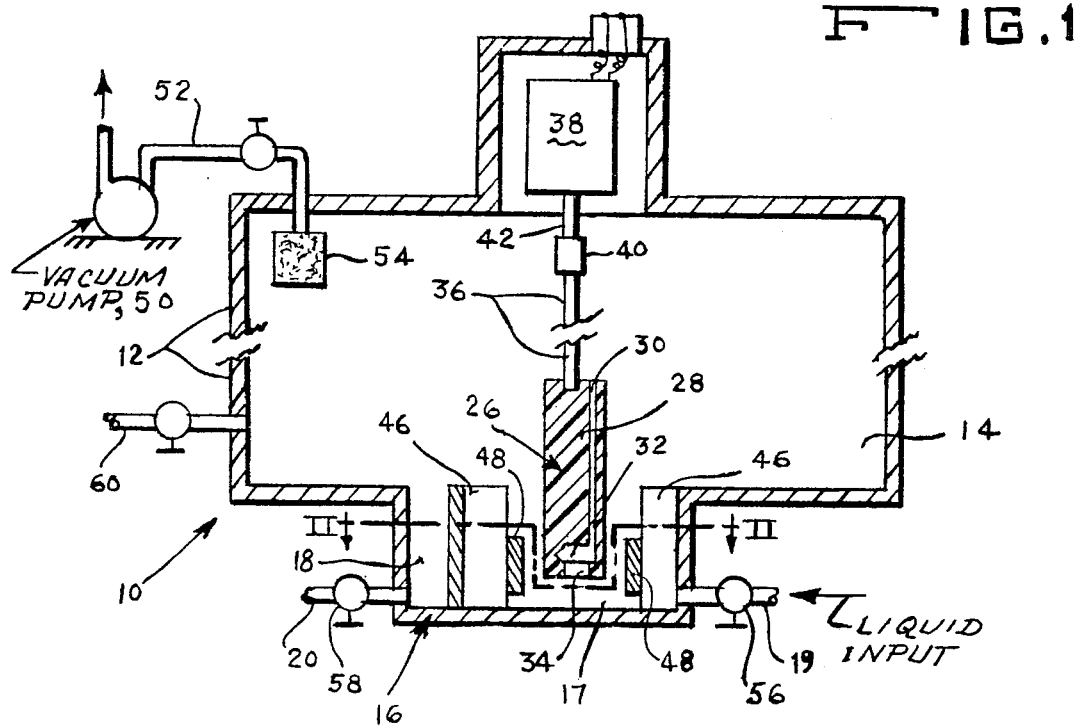
FIG. 1 is a partially schematic, side elevational view, shown partly in cross section, of the apparatus of this invention for separating a substance from a liquid.

Reference is now made to FIG. 1 of the drawing which clearly shows in schematic fashion the apparatus 10 for separating a substance from a liquid in which it has been contained. Although the primary use of the present invention is to separate a volatile substance, such as a chlorinated solvent, from a nonvolatile liquid, such as hydraulic fluid, the term substance may also include other liquids, gases or small particulate solid material.

Apparatus 10 is made up of a housing 12 forming a chamber 14 therein which is capable of being evacuated in a manner to be described hereinbelow to a suitable vacuum of approximately 20 inches Hg. Located within the lower portion 16 of housing 12 is a primary liquid container 17 into which a contaminated liquid enters. A secondary liquid container 18 is located adjacent to and is interconnected with container 17.

Secondary container 18 is of lesser size than the primary container 17 and has an opening 44 (shown in FIG. 2) therein which interconnects container 18 to container 17. Container 18 captures the atomized or cleansed liquid, permits a portion of the atomized or cleansed liquid to exit therefrom through outlet line 20 and passes the remainder of the atomized or cleansed liquid back into container 17 for reatomization. The contaminated liquid (that is, the liquid containing the undesirable substance) enters through an inlet line 19 on the side of container 17 and exits as a cleansed liquid through an outlet line 20 on the other side of container 18.

Figure 2:
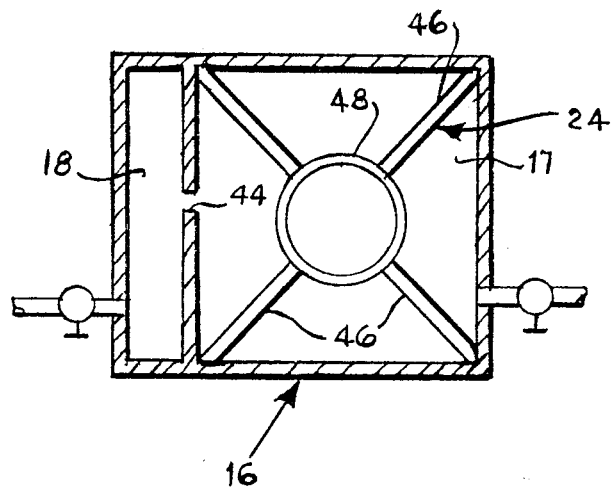
FIG. 2 is a cross sectional view of the apparatus of this invention for separating a substance from a liquid taken along line II—II of FIG. 1.
Figure 3:
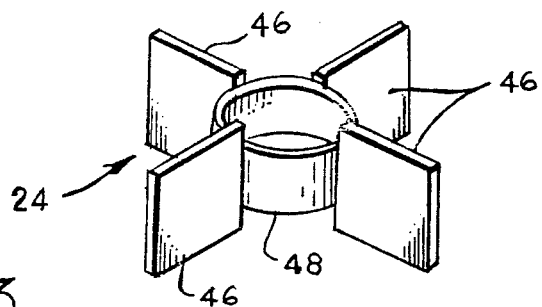
FIG. 3 is a pictorial representation of the baffle utilized with the apparatus of this invention for separating a substance from a liquid.

As shown more clearly in FIG. 2 of the drawing the primary liquid container 17 houses a baffle 24 therein as shown more clearly in FIG. 3 of the drawing, and an atomizer 26 as shown in FIG. 1 of the drawing. As clearly shown in FIGS. 1 through 3 of the drawing, baffle 24 is made up of a plurality of outstanding wings or elements 46 which are connected to a centrally located ring 48 having a lesser overall height than elements 46. Baffle 24 is placed within container 17 and atomizer 26 is positioned within the central opening of ring 48. Baffle 24 is utilized to substantially eliminate the undesirable whirlpool effect created by atomizer 26. By the use of baffle 24 liquid is prevented from being forced against and remaining against the sides of container 17 but allows liquid to continually flow to the center of container 17 for introduction into atomizer 26.

Although apparatus 10 of this invention may incorporate therein a number of different types of atomizers, a preferred atomizer 26 can be found in U.S. Pat. No. 3,659,957, issued May 2, 1972 to this inventor formerly known as Vann Yuen and which as stated above is incorporated herein by reference. More specifically, atomizer 26 is made up of a cylindrical body 28 having a plurality of vertically extending passageways 30 (one of which being shown in FIG. 1 of the drawing) about one-eighth inch in diameter. Passageways 30 open into a chamber 32 and a central opening 34.

A shaft 36 is utilized to interconnect body 28 to any suitable drive means in the form of, for example, a 7000 RPM. AC-DC electric motor 38. Any suitable coupling element 40 is used to accomplish the connection of shaft 36 to a shaft 42 of motor 38. The detailed operation of atomizer 26 will be set forth below during an explanation of the operation of separating apparatus 10 of this invention.

Interconnected with chamber 14 of housing 12 by line 52 is a conventional vacuum pump 50 which is utilized to create the desired vacuum within chamber 14 of approximately 20 inches Hg. Also attached to the vacuum line 52 and located within chamber 14 is a conventional liquid separator or demister 54 (a stainless steel wool filter) in order to separate any of the liquid from the vaporized substance drawn out of chamber 14 by vacuum pump 50.

OPERATION AND METHOD OF THE PREFERRED EMBODIMENT

Operation of separating apparatus 10 of this invention commences with the introduction of a contaminated liquid into container 17 through line 19. This contaminated liquid may be in the form of used hydraulic fluid, for example. Rotation of body 28 of atomizer 26 by electric motor 38 causes the contaminated liquid within container 17 to be forced upwardly through passageways 30 after entering through opening 34. The liquid leaves passageways 30 of atomizer 26 as a fine globular spray. The spray of fine particles creates an infinitely large surface area in the liquid. When this occurs the undesirable substances such as the volatile chlorinated solvents which have a lower boiling point than the nonvolatile liquid (hydraulic fluid) overcomes the surface tension and is released spontaneously into the vacuum space of chamber 14. The vaporized substance is drawn from chamber 14 by vacuum pump 50 through demister 54 and line 52.

During atomization, approximately three quarters of the atomized liquid flows down the sides of housing 12 and into primary container 17 while approximately one quarter of the liquid flows into secondary container 18. During this entire procedure the contaminated liquid flow through input line 19 is adjusted by valve 56 so that contaminated liquid flows into container 17 at the same rate in which the cleansed liquid flows out of container 18 through line 20. Adjustment of this existing flow rate of cleansed liquid is made by means of valve 58. Liquid which is not removed from container 18 flows from container 18 back into container 17 through opening 44 and combines with liquid already in container 17 for reatomization.

It is generally preferred to operate atomizer 26 at a rotational speed of approximately 2,000–10,000 RPM's. At this speed, the rate of atomization is approximately ten times the rate of the liquid input or discharge. Consequently, the liquid, in general, will be reatomized approximately ten times prior to discharge from container 18 of apparatus 10.

The entire atomization process may be rendered more efficient by the introduction of a small quantity of air or nitrogen through line 60 into chamber 14. The amount of air or nitrogen should be so little as not to affect the vacuum within chamber 14 but sufficient to aid in the vaporization or atomization process.

DETAILED DESCRIPTION OF THE ALTERNATE EMBODIMENT

FIGS. 4 through 6 are now referred to for an alternate embodiment of this invention in the form of separating apparatus 70 which is capable of use with larger quantities of contaminated liquid. Since many of the components or elements utilized within separating apparatus 70 shown in FIGS. 4–6 of the drawing are similar to the elements shown with respect to separating apparatus 10, all elements which are identical will be given the same reference numerals of all the figures of the drawing in order to simplify the understanding of the alternate embodiment of this invention.

As shown in FIG. 4 of the drawing, apparatus 70 is constructed in the form of an elongated tank or housing 72. Housing 72 forms a vacuum chamber 74 therein. Creating the vacuum within chamber 74 is any conventional vacuum pump 50 which is operably attached to the interior of chamber 74 by means of a vacuum line 52. Line 52 terminates in a conventional liquid separator or demister 54 (made of a stainless steel wool filter) located within chamber 74.

With the embodiment shown in FIGS. 4 through 6, a liquid separating container 76 is located in the upper portion of chamber 74 and is more clearly illustrated in FIG. 5 of the drawing. Container 76 is utilized to hold therein the contaminated liquid to be atomized. Any suitable support arrangement can be utilized to secure container 76 in place. An example of such a support arrangement may take the form of liquid inlet lines 80 and 82 to which container 76 may be secured by any suitable securing method.

Still referring to FIGS. 5 and 6 of the drawing, container 76 has located therein a baffle 24 similar to the type of baffle utilized with the embodiment shown in FIG. 3 of the drawing. Centrally located within ring 48 of baffle 24 is atomizer 26 which operates in a similar fashion to atomizer 26 described hereinabove with respect to FIGS. 1–3. Atomizer 26 is interconnected to a conventional motor 38 by a drive shaft 36 in order to rotate the atomizer at a sufficient speed. As stated above, atomizer 26 may take the form of the atomizer described in U.S. Pat. No. 3,659,957 issued May 2, 1972 to this inventor formerly known as Vann Yuen.

Housing 72 of separating apparatus 70 contains therein main inlet line 80 which is capable of feeding at a predetermined rate of flow by means of valve 85 contaminated liquid into container 76. Located substantially at the bottom of housing 72 is a liquid outlet line 86 which by means of pump 88 draws the liquid from the bottom of housing 72 after atomization. A predetermined amount of liquid can be withdrawn from line 86 by line 90 at valve 92 while the remaining liquid is fed back into container 76 through the other end of line 86 (referred to hereinabove as inlet line 82). The rate at which new contaminated liquid enters container 76 through line 80 is equal to the rate of liquid leaving apparatus 70 by means of line 90. In addition, container 76 is supported by direct securement to input lines 80 and 82 as clearly depicted in FIG. 5.

OPERATION AND METHOD OF THE ALTERNATE EMBODIMENT

The operation of separating apparatus 70 shown in FIGS. 4 through 6 is similar to the operation of apparatus 10 shown in FIGS. 1 through 3. As atomizer 26 is rotated, the contaminated liquid which includes the undesirable substance passes through atomizer 26 and is sprayed in mist form into the vacuum chamber 74. The undesirable substance in vapor form is withdrawn from chamber 74 by means of vacuum pump 50 through line 52. The remaining liquid flows down the side walls of housing 72 and is eventually withdrawn from chamber 74 through line 90. Approximately ten percent of the liquid is discharged by valve 92 as the finished product or cleansed liquid while approximately 90 percent of the remaining atomized liquid is fed back to container 76 through line 86 (82) for reatomization.

The flow rate of the incoming liquid through line 80 is equal to the flow rate of the liquid discharged through line 90. Since the atomization rate is approximately ten times faster than the liquid rate, the contaminated liquid in essence will be atomized ten times before being discharged from the system. As with apparatus 10, air or nitrogen can be introduced into chamber 74 in minute quantities through line 60 in order to increase the speed of the vaporization or atomization process. The entire chamber 74 may be completely relieved of liquid at any time during the procedure by opening exit valve 94 in line 96.

Although the invention has been described with reference to particular embodiments, it will be understood that this invention is also capable of further and other embodiments within the spirit and scope of the appended claims.

I claim:

1. An apparatus for separating a substance from a liquid within which said substance is contained comprising:
    a housing, said housing forming a chamber therein;
    means operably connected to said housing for creating a vacuum within said chamber;
    means situated within said chamber for receiving said liquid therein, and means connected to said liquid receiving means for feeding said liquid to said liquid receiving means at a predetermined rate;
    means operably positioned within said liquid receiving means for atomizing said liquid thereby spraying said liquid in mist form into said chamber and vaporizing said substance within said chamber;
    said vacuum creating means being capable of withdrawing said vaporized substance, and said liquid receiving means being capable of receiving said atomized liquid; and
    means operably connected to said housing for removing said atomized liquid at a predetermined rate.

2. An apparatus for separating a substance from a liquid within which said substance is contained as defined in claim 1 wherein said liquid receiving means comprises a primary container for receiving said liquid to be atomized and a secondary container for receiving said atomized liquid, said primary and said secondary containers being interconnected, and said means for removing said atomized liquid being connected to said secondary container in order to remove a portion of said atomized liquid while the remainder of said atomized liquid returns to said primary container for reatomization.

3. An apparatus for separating a substance from a liquid within which said substance is contained as defined in claim 2 further comprising a baffle located within said primary container, and said atomizer means being situated within said baffle.

4. An apparatus for separating a substance from a liquid within which said substance is contained as defined in claim 3 wherein said liquid receiving means is located at the bottom of said housing.

5. An apparatus for separating a substance from a liquid within which said substance is contained as defined in claim 4 wherein said baffle comprises a ring-shaped, centrally located element and a plurality of elements extending therefrom, said atomizing means being partially contained within said ring-shaped element.

6. An apparatus for separating a substance from a liquid within which said substance is contained as defined in claim 5 further comprising means for introducing a predetermined amount of a gas into said chamber during atomization in order to aid in the atomization procedure.

7. An apparatus for separating a substance from a liquid within which said substance is contained as defined in claim 1 wherein said liquid receiving means comprises a container, said container being mounted adjacent the top of said housing.

8. An apparatus for separating a substance from a liquid within which said substance is contained as defined in claim 7 wherein said means for removing said atomized liquid is interconnected between said housing and said container, said atomized liquid removing means being capable of removing a portion of said atomized liquid permanently from said housing and feeding the remainder of said atomized liquid back to said container for reatomization.

9. An apparatus for separating a substance from a liquid within which said substance is contained as defined in claim 8 further comprising a baffle located within said container and said atomizer means being situated within said baffle.

10. An apparatus for separating a substance from a liquid within which said substance is contained as defined in claim 9 wherein said baffle comprises a ring-shaped, centrally located element and a plurality of elements extending therefrom, said atomizing means being partially contained within said ring-shaped element.

11. An apparatus for separating a substance from a liquid within which said substance is contained as defined in claim 10 wherein said means for feeding said liquid into said container and said means for removing a portion of said atomized liquid and feeding the remainder of said atomized liquid back into said container also support said container adjacent the top of said housing.

12. An apparatus for separating a substance from a liquid within which said substance is contained as defined in claim 11 further comprising means for introducing a predetermened amount of a gas into said chamber during atomization in order to aid in the atomization procedure.

13. A method of separating a substance from a liquid within which said substance is contained comprising the steps of:

(a) placing a first container and a second container in a vacuum chamber;

(b) interconnecting said first container to said second container;

(c) feeding said liquid into said first container;

(d) simultaneously atomizing said liquid and creating a vacuum in said chamber in order to draw off said substance being vaporized during atomization of said liquid;

(e) recovering a portion of the atomized liquid in said first container and recovering the remaining portion of said atomized liquid in said second container;

(f) removing a portion of said atomized liquid from said second container; and (g) feeding the remaining portion of said atomized liquid from said second container into said first container for further atomization thereof.

14. A method of separating a substance from a liquid within which said substance is contained as defined in claim 13 further comprising the step of introducing a predetermined additional amount of said liquid into said first container, said additional predetermined amount of said liquid being substantially equal to said portion of said atomized liquid being removed from said second container.

15. A method of separating a substance from a liquid within which said substance is contained as defined in claim 14 further comprising the step of substantially eliminating the whirlpool effect created during atomization of said liquid.

16. A method of separating a substance from a liquid within which said substance is contained as defined in claim 15 further comprising the step of introducing a minute quantity of gas into said chamber to aid in the atomization procedure.

* * * * *